United States Patent

[11] 3,542,161

| [72] | Inventor | Bronislaus I. Ulinski<br>Palm Beach, Florida |
|---|---|---|
| [21] | Appl. No. | 754,843 |
| [22] | Filed | Aug. 23, 1968 |
| [45] | Patented | Nov. 24, 1970 |
| [73] | Assignee | Eaton Yale & Towne Inc.<br>Cleveland, Ohio<br>a corporation of Ohio |

[54] LOAD HEIGHT INDICATOR FOR INDUSTRIAL TRUCKS
12 Claims, 9 Drawing Figs.

[52] U.S. Cl. .................................................. 187/9,
                                          214/730; 33/185.5
[51] Int. Cl. .................................................. B66b 9/20
[50] Field of Search .................................. 187/9, 10,
                                      1; 214/730; 33/185.5, 127; 242/107

[56] References Cited
UNITED STATES PATENTS

| 2,395,407 | 2/1946 | Hayward | 242/107 |
| 2,828,880 | 4/1958 | Perry | 214/730 |
| 3,107,750 | 10/1963 | Bishop | 187/9 |

Primary Examiner—Harvey C. Hornsby
Attorney—Teagno and Toddy

ABSTRACT: An indicator is so positioned in an industrial truck having fixed and movable uprights, and a carriage, as to make possible its operation by a tape or cable to indicate the position of the carriage relatively to the fixed uprights regardless of the position of the movable uprights. The indicator is capable of operating control devices to control means on the truck including the lifting mechanism.

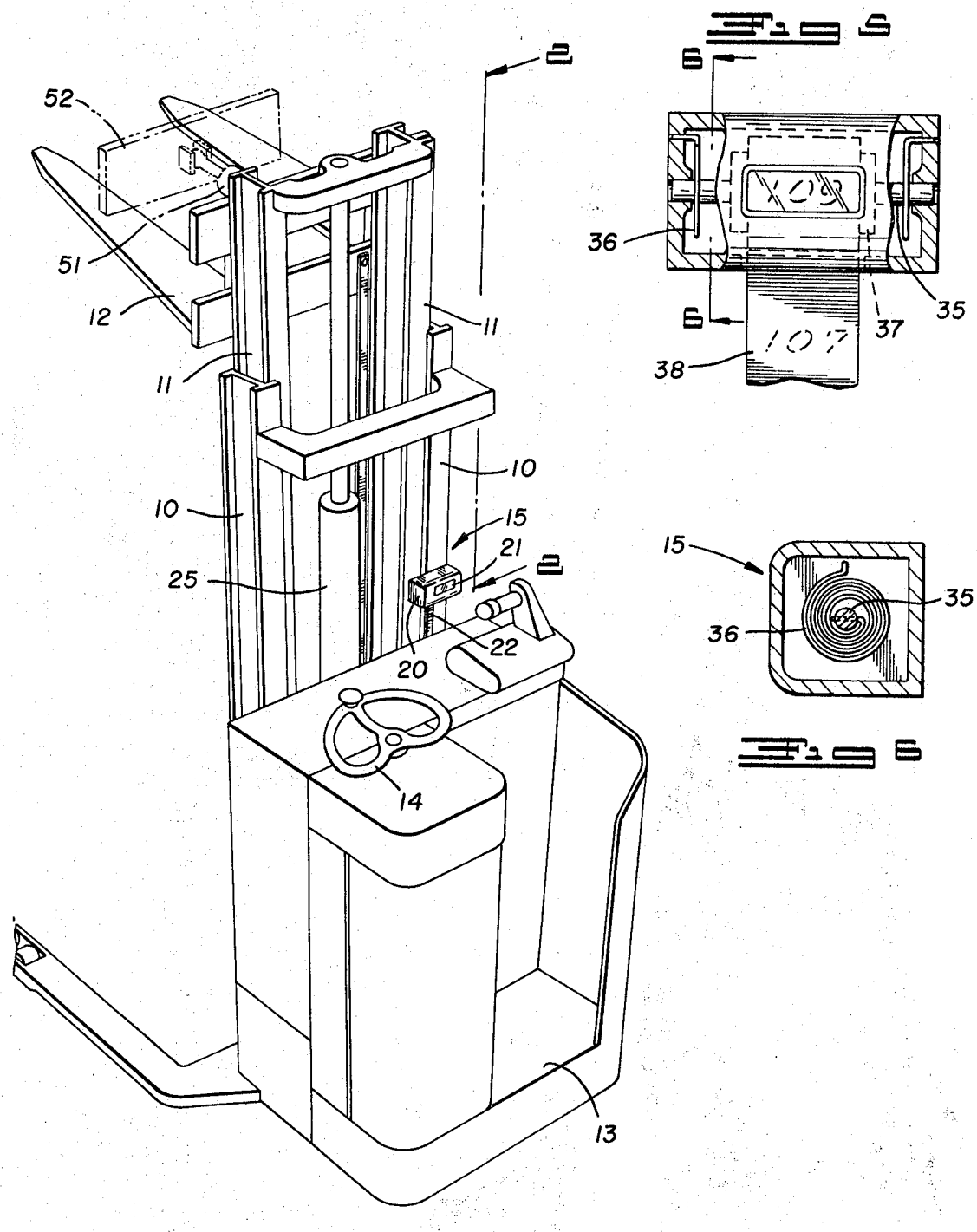

Patented Nov. 24, 1970
3,542,161
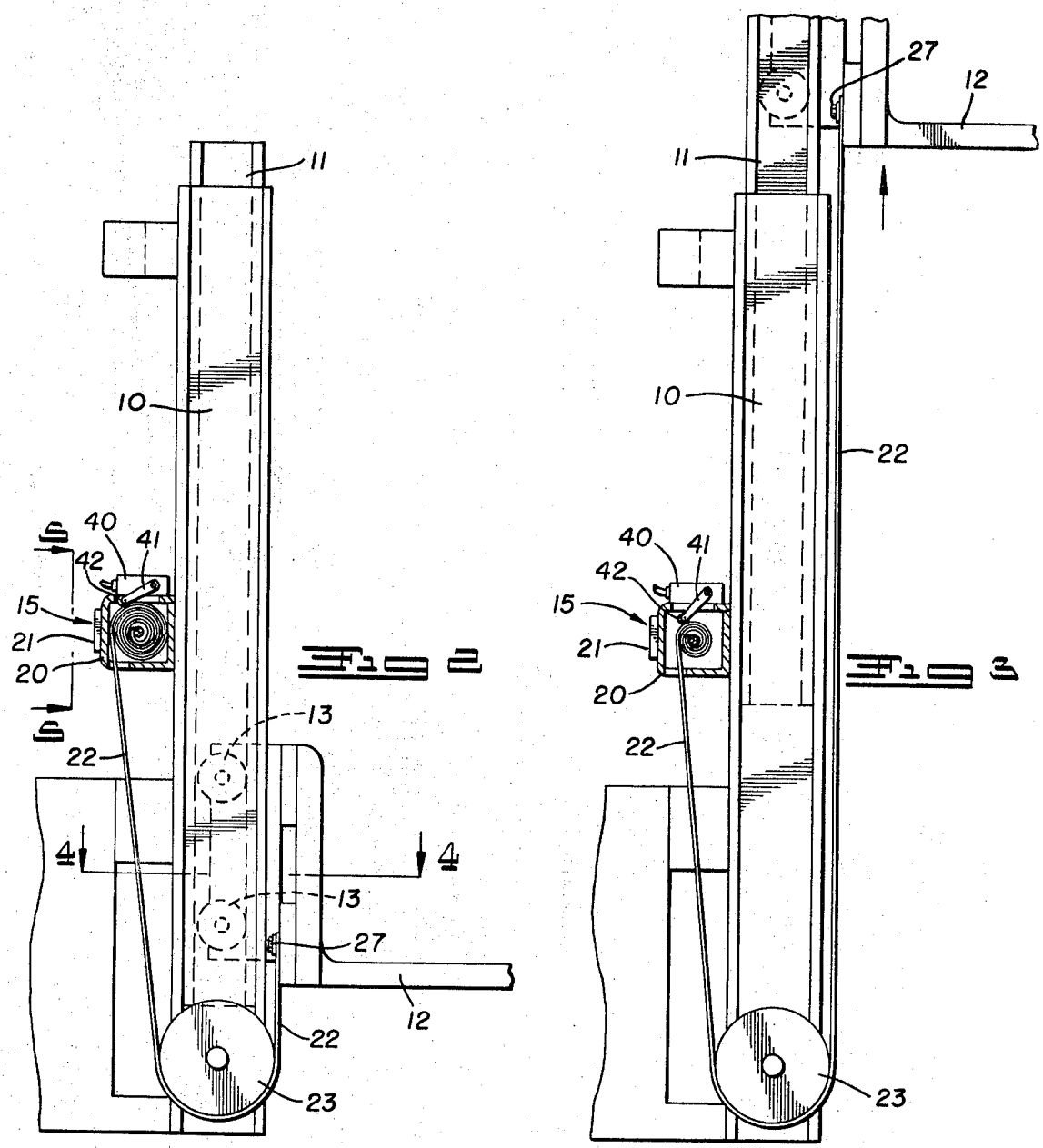
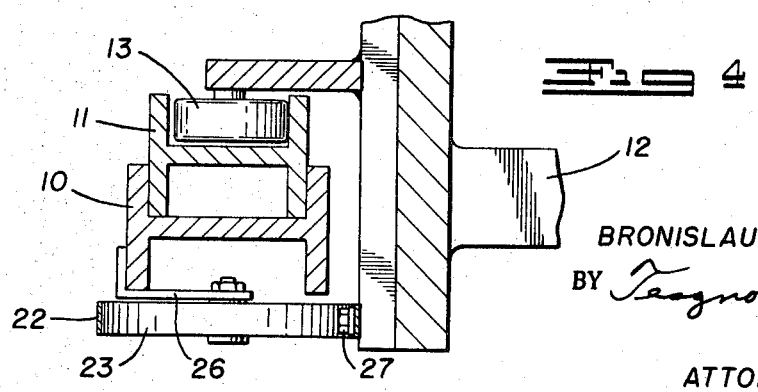
INVENTOR.
BRONISLAUS I. ULINSKI
BY Feagno & Toddy
ATTORNEY

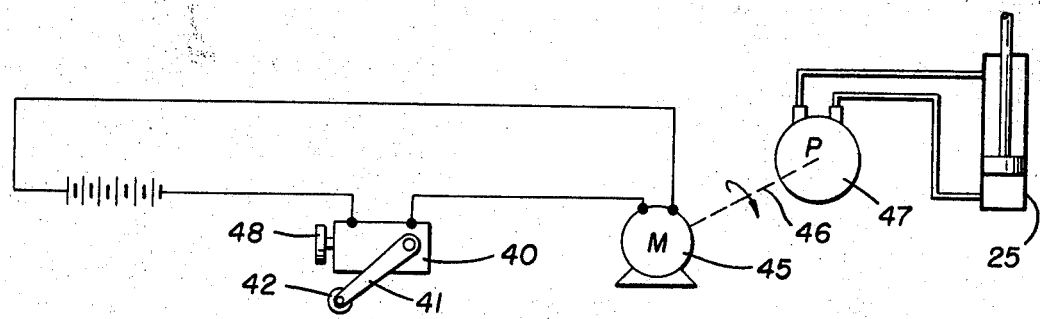
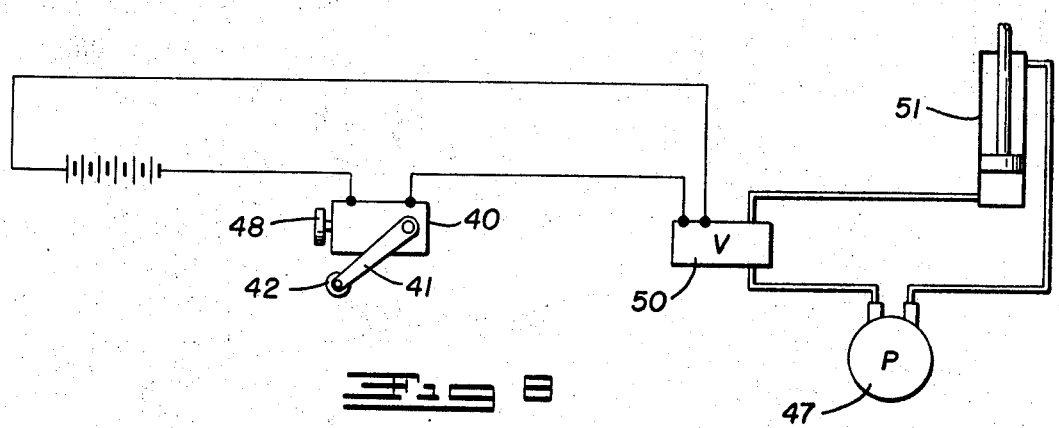
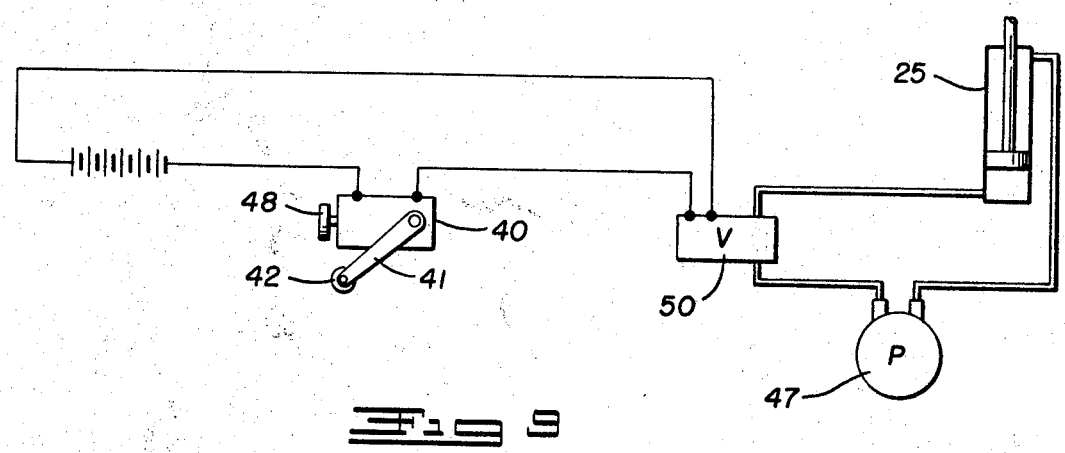

3,542,161

LOAD HEIGHT INDICATOR FOR INDUSTRIAL TRUCKS

This invention relates to industrial trucks, and more particularly, to an industrial truck of the type in which an elevating load carriage is adapted to be moved vertically on one or more moving uprights, the moving uprights being mounted for movement relatively to primary or stationary uprights. Trucks of the particular class are used to lift and transport loads, and to store transported loads in racks, many times at rather considerable heights.

As those skilled in the art fully appreciate, it is extremely difficult for an operator to determine visually the exact height to which a load carriage has been lifted. Unless the operator is entirely certain as to the relationship of the load carriage and a rack, or to a stored load relatively to which he wishes to store a further load, he may damage the storage racks, the stored load, or the load that he is transporting and attempting to store. It is, therefore, extremely important that the operator know exactly the height relationship between the load he wishes to store and the rack or load on which the transported load is to be applied.

So far as I know, operators of trucks of the particular class today are required to observe visually the movement of the load carriage, its relation to a rack or other load, and then to maneuver the truck for storing. Obviously, because of the care that must be observed, the operation of the truck is slowed very considerably, therefore adding greatly to warehousing costs. Further, even though the operator may use very good care, he will sometimes fail to position his load properly, and will then damage that load, the racks, or another load, all as is well known.

As a feature of my invention through which I believe the storing of loads is facilitated, I contribute a visual load height indicator that will at all times indicate to the operator the vertical position of the load carriage. Since the operator knows the construction of the racks, and the dimensions of the loads already stored on the racks, he can merely, by watching the indicator, determine exactly the position of his carriage and whether or not the load thereon may be safely stored.

As a further feature of the invention, the load height indicator is operated by very simple means such as a self-storing spring tape, or a cable, this being made possible through the use of guide means that so guide the cable or the equivalent thereof, that it is not affected by the position of the moving uprights. In other words, the load height indicator will be responsive only to the vertical movement of the load carriage.

As a still further feature of the invention, the load height indicator may be at eye level relatively to the operator of the industrial truck while through the guide means, the carriage may move to an extreme low position where its height will still be indicated by the indicator. In other words, when the carriage is below the indicator, and at its lowest possible level, the indicator will show the distance of the carriage above the level of the ground in which the truck is operating. Therefore, the entire range of movement of the carriage and its distance above the ground is shown by the indicator at all times.

As a still further feature of the invention, the lifting means that are utilized for moving the uprights and the load carriage, may be controlled by means forming a part of the indicator. As an example, where an electric motor operates a pump for supplying fluid to hydraulic rams functioning as the lifting means, the motor circuit may be controlled by switches within the indicator and operated through the self-storing tape or the cable. Obviously, with means of this type, the operator need merely set a switch and the load will be elevated to a desired position and there held.

Further, switches actuated by the tape or cable may be utilized for operating a valve for slowing the lifting speed when the load carriage is raised to a particular height. Much effort has been expended in the development of means of decreasing lifting speed once a load has been raised a predetermined degree, as high lifting speeds tend to render industrial trucks unstable once a load has been elevated to a considerable height. The art contains numerous suggestions for automatically decreasing lifting speeds, but the mechanisms required are costly and difficult to install. Also, they cannot be adjusted or easily controlled, or eliminated, as may be required. Obviously, in my invention the feature is easily utilized and controlled.

The advantages of my invention will further be appreciated on consideration that it is possible to use the indicator mechanism for controlling the operation of auxiliary load manipulating mechanisms such as load pushers. Thus, in accordance with my invention, until the load is elevated to a particular position, a conventional pusher mechanism for pushing a load off the carriage, would be inoperative, thereby further contributing to the utility of the truck.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings, FIG. 1 illustrates an industrial truck of the type to which my invention may be applied. FIG. 2 is a partial elevation taken in the direction of the arrows 2—2 of FIG. 1. FIG. 3 is a view similar to FIG. 2 with the carriage and movable uprights in a partially raised position. FIG. 4 is a partial section along line 4—4 of FIG. 2. FIG. 5 is a partial section and elevation on line 5—5 of FIG. 2. FIG. 6 is a section along line 6—6 of FIG. 5. FIG. 7 illustrates a modification in which a switch actuated by the indicator controls a motor. FIGS. 8 and 9 are diagrammatic views illustrating modifications of the invention in which a valve is controlled by the indicator.

Referring now more particularly to the drawings, I illustrate in FIG. 1 a truck of the type to which my invention may be applied. This truck is formed with the usual fixed uprights 10, moving secondary uprights 11, and a carriage 12. It will be understood, as was earlier set forth, that my invention may be applied to an industrial truck of the class in which more than one moving upright is utilized.

The operator of the truck stands on the platform 13 and controls the steering movement of the truck through a steering wheel 14. At 15, there is positioned the indicator forming part of my invention and adapted to indicate to the operator the exact position of the carriage 12 relatively to the floor or the ground on which the truck moves.

The upright assembly that is utilized in the truck that I illustrate in order to describe my invention, is probably best shown in FIG. 4, where the uprights and carriage parts at one side of the truck are drawn. There, it will be seen that the primary or fixed uprights 10 are in the form of an I beam with a pair of flanges. The secondary uprights 11 are also I beams adapted to nest partially relatively to the fixed uprights 10. This construction is well known to those skilled in the art. Rollers, not shown, mount the secondary uprights 11 for free movement relatively to the primary uprights 10.

The load carriage 12 is shown equipped with carriage rollers 13 that ride in the channel of the secondary upright 11 shown in FIG. 4. Generally, upper and lower rollers are utilized for guiding the carriage in its movement relatively to the secondary uprights, and these rollers may assume various positions. Further additional rollers will be utilized on the carriage 12 for accepting side pressures such as are caused by offset loads, and these are also standard and well known, and are not shown. For contributing lift to the secondary uprights and the load carriage I utilize a hydraulic ram assembly including a ram 25. This ram 25 will contribute lifting movement directly to the secondary uprights, and through chains to the carriage.

These chains are not illustrated by me since they are conventional. As a matter of fact, the ram, the uprights and the mounting of the carriage are illustrated only for the purpose of outlining the relationship of my invention to a typical industrial truck. Obviously, my invention may be applied to trucks in which the uprights are of different form, and in which the carriage is mounted in a different operating relationship relatively to the uprights.

The indicator 15 of my invention includes a casing 20 formed with an opening 21 through which may be viewed the indicia on a self-storing spring tape 22, this being the particular form of the invention illustrated in FIG. 2. The spring storing tape 22 runs downwardly from the indicator casing to a guide roller 23. This guide roller may be secured to the main frame or to the lower end of the primary or fixed upright 10 at the one side of the industrial truck shown in FIG. 4.

In FIG. 4, the roller 23 guiding the self-storing spring tape 22 is shown secured to the primary upright 10 by a bracket 26. Bracket 26 is so positioned that it holds the roller 23 in vertical alinement with a part 27 of the carriage through which the measuring end of the tape 22 is secured to the carriage, and in vertical alinement also the the indicator casing 20.

It will be noted that in FIG. 2 the carriage is at its lowermost position relatively to the truck and the fixed uprights 10. In this position, it will be appreciated that because of the location of the guide roller 23 at the extreme low level shown, the tape 22 will be well guided between the carriage and the indicator assembly. Obviously, the tape will be so marked that with the carriage in the position shown in FIG. 2, the height of the carriage will be indicated in accordance with the height thereof above the floor.

In FIG. 3, the carriage 12 has, of course, been raised through operation of the ram 25 and it will be noted that the tape 22 has been drawn outwardly of the indicator casing 20, so that indicator 15 will now show that the carriage is at a considerably higher position relatively to the floor than in FIG. 2. It will be noted further that in FIG. 3 the secondary uprights 11 have also been raised from their position in FIG. 2. However, the raising of the uprights 11 relatively to the uprights 10, has in no way interfered with the operation of the indicator.

Of course, those skilled in the art will understand that the manner of mounting the roller 23 and the manner of securing the self-storing spring tape to the carriage may be changed, so long as the tape will move in a direct path between the carriage and the indicator casing 20, so that the reading of the indicator will show the movement of the carriage relatively to the floor, regardless of the position of the secondary uprights or other parts of the lifting mechanism.

In FIGS. 5 and 6 I show a modification of the indicator of my invention. There, the indicator utilizes a spring rotated shaft 35 controlled by a torsion spring 36. On the shaft 35 there is mounted an indicator drum 37 on which, in this modification there may be wound an indicator tape 38 as a window shade is mounted on a drum or roller. As those skilled in the art will understand, there are many forms of indicators that may be utilized by me, it being obvious that the basic feature of my invention resides in the movement of an indicator through utilization of a particularly mounted tape, cable, self-storing spring or the like.

It will be noted from FIGS. 2 and 3 that on the upper surface of the indicator casing 20 of indicator assembly 15, there is mounted a switch casing 40 from which projects a lever 41, at the end of which there is a roller 42, adapted to bear on the surface of the self-storing spring tape 22. The switch 40 may be utilized for controlling a considerable number of mechanisms as referred to generally in the first part of the specification. Thus, in FIG. 7, the switch 40 is shown as controlling the operation of a motor 45. In the form here illustrated this is the motor that through a shaft 46 drives a pump 47 for supplying fluid to the ram 25. By merely setting the switch 40, which may be adjustable as through a hand wheel 48, or in any other standard manner, the roller 42 will move lever 41 when the self-storing spring 22 reaching a particular position in the indicator housing 20. This will, through operation of the switch 40, bring about a stoppage of rotation of the motor 45 so that the pump will no longer supply fluid to the ram 25. Therefore, by merely setting the switch 40, the operator can cause operation of the ram automatically to a degree required to bring the carriage 12 to a predetermined set position relatively to a storage rack or a load, all for the purposes that were made clear earlier in this specification.

If desired, the switch 40, may be used as illustrated in FIG. 8 for controlling a valve 50. The valve 50 may be utilized for controlling a ram 51 adapted to actuate a load manipulating device of the type illustrated in phantom diagrammatically in FIG. 1. In FIG. 1 the ram 51 is adapted to operate a load pusher 52 of standard construction and there shown merely in outline form. Thus, by a particular setting of the switch 40, it becomes impossible to operate the pusher to push out the load until after the load platform 12 has been raised to a particular predetermined position.

If desired, the valve 50 illustrated in FIG. 8 may be utilized as shown in FIG. 9 for controlling the flow of fluid to the ram 25 so as to bring about a slower operation of the ram 25 at a particular point of its lifting movement. In other words, once the ram 25 has acted to lift the load to a predetermined position, the switch 40 will be actuated and it will in turn energize the valve 50 so that it will decrease automatically the flow of fluid to the ram 25. Under these circumstances, the ram 25 will operate at a relatively slow speed. As I have explained earlier, operation of the ram at a relatively slow speed is quite important in order to give greater stability to the truck with the load at a high elevated position.

I do believe the very considerable merits of my invention and the contributions resulting therefrom will now be apparent.

I claim:

1. In a truck of the class described, a main frame, a pair of vertically fixed uprights extending substantially vertically from a point near the bottom of said main frame, movable uprights mounted on said vertically fixed uprights for vertical movement relative to said fixed uprights, a load carriage mounted for vertical movement on said movable uprights, means for contributing lifting movement to said load carriage relatively to said movable uprights and to said movable uprights relatively to said vertically fixed uprights, a load carriage height indicator fixed relatively to said vertically fixed uprights and said main frame, a flexible elongate member partially contained within said height indicator and removable extending therefrom to said load carriage and attached thereto for movement directly proportional to vertical movement of said carriage, said flexible elongate member carrying indicia of distance for indication at the height indicator of the height of said load carriage for any given position thereof.

2. In the combination of claim 1, the feature of guide means mounted near the lower end of said vertically fixed uprights for guiding said elongate member for movement proportional to the vertical movement of said load carrying carriage, said guide means positioning said elongate member for movement free of said moving uprights.

3. In the combination of claim 1, the feature that at least a part of said guide means is mounted on said vertically fixed uprights so that at least a portion thereof is at a level below the position reached by the point of attachment of said elongate member to said carriage at the lowermost position of said carriage relatively to the vertically fixed uprights, said elongate member extending downwardly from said indicator and into guided relation with said lowermost portion of said guide means holding the elongate member for movement free of said moving uprights in all positions of said moving uprights.

4. In the combination of claim 1, the feature of control means including means responsive to movement of said elongate member and actuated thereby for controlling the operation of the means contributing lifting movement to said moving uprights and load carriage upon said load carriage movement to a predetermined height.

5. In the combination of claim 4, the feature that said means contributing lifting movement is a hydraulic ram to which fluid is directed by a pump.

6. In combination with claim 1, the feature that said means contributing lifting movement is a hydraulic ram to which fluid is directed by a pump, the speed of operation of said ram being controlled by movement of said elongated member so as to decrease the speed of lift of said carriage as the carriage approaches any predetermined vertical position.

7. In the combination of claim 3, the feature that said lowermost portion of said guide means is a roller positioned with a part of its periphery adapted to receive the elongate member from said carriage and to hold said elongate member in a single plane substantially parallel to the uprights.

8. In a truck of the class described, a main frame, a pair of vertically fixed uprights extending substantially vertically from a point near the bottom of said main frame, movable uprights mounted on said vertically fixed uprights for vertical movement relatively to said fixed uprights, a load carriage mounted for vertical movement on said movable uprights, means for contributing lifting movement to said load carriage relatively to said movable uprights and to said movable uprights relatively to said vertically fixed uprights, a load carriage height indicator fixed relatively to said fixed uprights and said main frame, a flexible elongate member partially contained within said height indicator and removably extending therefrom to said load carriage and attached thereto for movement directly proportional to vertical movement of said load carriage, said flexible elongate member carrying indicia of distance for indication at the height indicator of the height of said load carriage, and means for guiding said elongate member whereby in all vertical positions of said load carriage and movable uprights movement of the elongate member will remain directly proportional to movement of said load carriage.

9. In the combination of claim 8, the feature that said guide means position said elongate member for movement free of said movable uprights.

10. The combination of claim 1 wherein said indicia of distance are visual markings indicating linear distance.

11. The combination of claim 10 wherein said height indicator includes a casing with an opening therein for reading said visual markings.

12. The combination of claim 1 wherein the uppermost vertical position of said carriage is controlled by means responsive to movements of said elongate member, said means being adaptable for setting a predetermined uppermost vertical position.